(12) United States Patent
Barthelemy et al.

(10) Patent No.: US 9,278,717 B2
(45) Date of Patent: Mar. 8, 2016

(54) PICKUP BOX WITH REINFORCED TIE-DOWN LOCATIONS

(71) Applicant: FORD GLOBAL TECHNOLOGIES, LLC, Dearborn, MI (US)

(72) Inventors: Bruno M. Barthelemy, Ann Arbor, MI (US); Mark Joseph Courtright, Allen Park, MI (US); Vincent Chimento, Plymouth, MI (US); Mark Keller, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 14/317,510

(22) Filed: Jun. 27, 2014

(65) Prior Publication Data

US 2015/0375801 A1 Dec. 31, 2015

(51) Int. Cl.
*B62D 33/02* (2006.01)
*B62D 29/00* (2006.01)
*B62D 65/00* (2006.01)
*B60P 7/08* (2006.01)
*B61D 45/00* (2006.01)

(52) U.S. Cl.
CPC .............. *B62D 33/02* (2013.01); *B60P 7/0807* (2013.01); *B61D 45/001* (2013.01); *B62D 29/008* (2013.01); *B62D 65/00* (2013.01)

(58) Field of Classification Search
CPC .. B60P 7/0807; B61D 45/001; B62D 29/008; B62D 33/02; B62D 65/00
See application file for complete search history.

(56) References Cited

U.S. PATENT DOCUMENTS

| 2,570,368 | A | * | 10/1951 | Moon | B61D 45/001 24/265 CD |
| 2,605,721 | A | * | 8/1952 | Johnson | B61D 45/001 24/115 K |
| 3,655,234 | A | * | 4/1972 | Kirschbaum | B60P 3/32 296/167 |
| 4,295,765 | A | * | 10/1981 | Burke | B60P 7/0807 296/167 |
| 4,741,653 | A | * | 5/1988 | Schmidt | B60P 7/0807 410/111 |
| 5,253,918 | A | * | 10/1993 | Wood | B60P 7/0815 264/273 |
| 5,271,705 | A | * | 12/1993 | Pijanowski | B60P 3/122 224/401 |
| 5,445,482 | A | * | 8/1995 | Davis | B60P 7/0807 114/218 |
| 5,788,437 | A | * | 8/1998 | Kalis, Jr. | B60P 7/0807 410/106 |
| 5,938,272 | A | * | 8/1999 | Jurica | B62D 25/2054 296/184.1 |

(Continued)

FOREIGN PATENT DOCUMENTS

AT 9266 U2 * 7/2007 ............ B60P 7/0807
CH DE 4307198 A1 * 9/1994 ............ B23K 11/11

(Continued)

*Primary Examiner* — Glenn Dayoan
*Assistant Examiner* — Paul Chenevert
(74) *Attorney, Agent, or Firm* — Jason Rogers; Brooks Kushman P.C.

(57) ABSTRACT

One of more cross members of a pickup bed structure include a hole in a flange in a location that is advantageous for installation of aftermarket accessories. The hole does not extend through the floorpan itself. When customers install aftermarket accessories that require holes through the floorpan, the customers are encouraged to align the new holes with the holes in the cross members. Consequently, loads applied by the aftermarket accessories are efficiently transferred to the frame rails.

17 Claims, 5 Drawing Sheets

(56) References Cited

U.S. PATENT DOCUMENTS

| | | | | |
|---|---|---|---|---|
| 6,089,639 | A * | 7/2000 | Wojnowski | B60P 3/14 296/37.6 |
| 6,102,469 | A * | 8/2000 | Shambeau | B60P 7/0807 296/184.1 |
| 6,530,730 | B2 * | 3/2003 | Swensen | B60P 7/0807 296/39.2 |
| 6,702,365 | B2 * | 3/2004 | Semple | B62D 33/02 296/183.1 |
| 6,793,272 | B2 | 9/2004 | Borugian | |
| 7,152,911 | B1 * | 12/2006 | McNulty | B62D 25/2054 296/184.1 |
| 7,390,155 | B1 * | 6/2008 | Diaz | B60P 7/0807 410/106 |
| 7,517,005 | B2 | 4/2009 | Kuriakose | |
| 7,537,423 | B1 * | 5/2009 | Abato, Jr. | B60P 7/0807 410/106 |
| 8,016,526 | B2 * | 9/2011 | Flannigan | B60P 7/0807 410/106 |
| 8,414,066 | B2 * | 4/2013 | Hustyi | B60P 7/0807 296/193.01 |
| 8,678,726 | B1 * | 3/2014 | Stubbs | B60P 3/079 410/23 |
| 9,090,293 | B1 * | 7/2015 | Courtright | B62D 25/2027 |
| 9,180,745 | B1 * | 11/2015 | Courtright | B60D 1/485 |
| 9,221,500 | B1 * | 12/2015 | Courtright | B62D 33/077 |
| 2012/0128441 | A1 * | 5/2012 | McDaniel | B60P 7/12 410/47 |
| 2012/0313399 | A1 * | 12/2012 | Caliskan | B62D 27/065 296/193.01 |
| 2013/0193671 | A1 * | 8/2013 | McCoy | B60D 1/28 280/495 |

FOREIGN PATENT DOCUMENTS

| | | | | |
|---|---|---|---|---|
| DE | 4103250 | A1 * | 8/1992 | B60P 7/0807 |
| GB | 538322 | A * | 7/1941 | B60G 99/002 |
| IT | EP 1645489 | A1 * | 4/2006 | B62D 21/20 |

* cited by examiner

PICKUP BOX WITH REINFORCED TIE-DOWN LOCATIONS

TECHNICAL FIELD

This disclosure relates to the field of pickup truck structures. More particularly, the disclosure pertains to the structure of a pickup bed.

BACKGROUND

Pickup trucks are motor vehicles with a rear open top cargo area often referred to as a bed. Pickup trucks are popular largely because the bed allows them to be utilized in so many different ways, including carrying a variety of types of cargo and towing various types of trailers. Traditionally the majority of body structures on pickup trucks have been formed from steel alloys. Through years of experience, pickup truck designers have learned how to design steel truck body parts that withstand the variety of demanding pickup truck applications. The current regulatory and economic environment have increased the importance of making pickup trucks more fuel efficient as well as functional and durable. One way to reduce the fuel consumption of a vehicle, especially when unloaded, is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design.

Aluminum alloys are generally identified by a four-digit number, the first digit of which typically identifies the major alloying element. When describing a series of aluminum alloys based on the major alloying element, the first number may be followed by three x's (upper or lower case) or three zeros. For example, the major alloying element in 6xxx (or 6000) series aluminium alloy is magnesium and silicon, while the major alloying element of 5xxx series is magnesium and for 7xxx series is zinc. Additional numbers represented by the letter 'x' (or zeros) in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

SUMMARY

An aluminum truck bed includes a beaded sheet metal floorpan and at least one cross member. The cross member includes front and rear flanges welded to the floorpan between the beads. One of the flanges defines a hole abutting a flat region of the floorpan between the beads but not extending into the floorpan. In one embodiment, the cross member is fabricated by roll forming which results in a cross member with a constant cross section. In another embodiment, the flange has a variable width to provide increased bearing area for a fastener. The flange may be re-inforced in the vicinity of the hole. A stiffener may be riveted to the cross member to stiffen the cross member near the point at which the cross member is bolted to frame rails. To minimize loads in the cross member, the hole may be located within one bead of the stiffener.

A pickup truck includes left and right frame rails, a cross member bolted to the frame rails, and a beaded floorpan welded to the cross member. The cross member includes a flange defining a hole. The hole is covered by a flat region of the floorpan. The cross member may include a roll formed channel riveted to a stiffener. The hole may be in either the channel or the stiffener. Instruction may encourage customers to align any hole through the floorpan with the hole in the cross member when installing after-market accessories.

A method of constructing a truck bed includes roll forming a cross member, stamping a floorpan, and welding the cross member to the underside of the floorpan. The cross member includes a front flange and a rear flange, one of which defines a hole. The hole may be formed into the stock from which the cross member is formed. A bead pattern is stamped into the floorpan. The flanges are welded to flat regions of the floorpan between the beads. The hole in the flange is aligned with a region of the floorpan that does not have a hole. The floorpan and the cross member may be formed from aluminum alloy stock, such as 6xxx. A stiffener may be riveted to the cross member near the hole.

DETAILED DESCRIPTION

Embodiments of the present disclosure are examples and other embodiments may take various and alternative forms. The figures are not necessarily to scale and some features may be exaggerated or minimized to show details of particular components. The specific structural and functional details disclosed are not to be interpreted as limiting, but merely as a representative basis for teaching one skilled in the art how to utilize the present invention. Various features illustrated and described with reference to any one of the figures can be combined with features illustrated in one or more other figures to produce embodiments that are not explicitly illustrated or described. Combinations and modifications of features consistent with the teachings of this disclosure could be used for particular applications or implementations.

Figure 1:
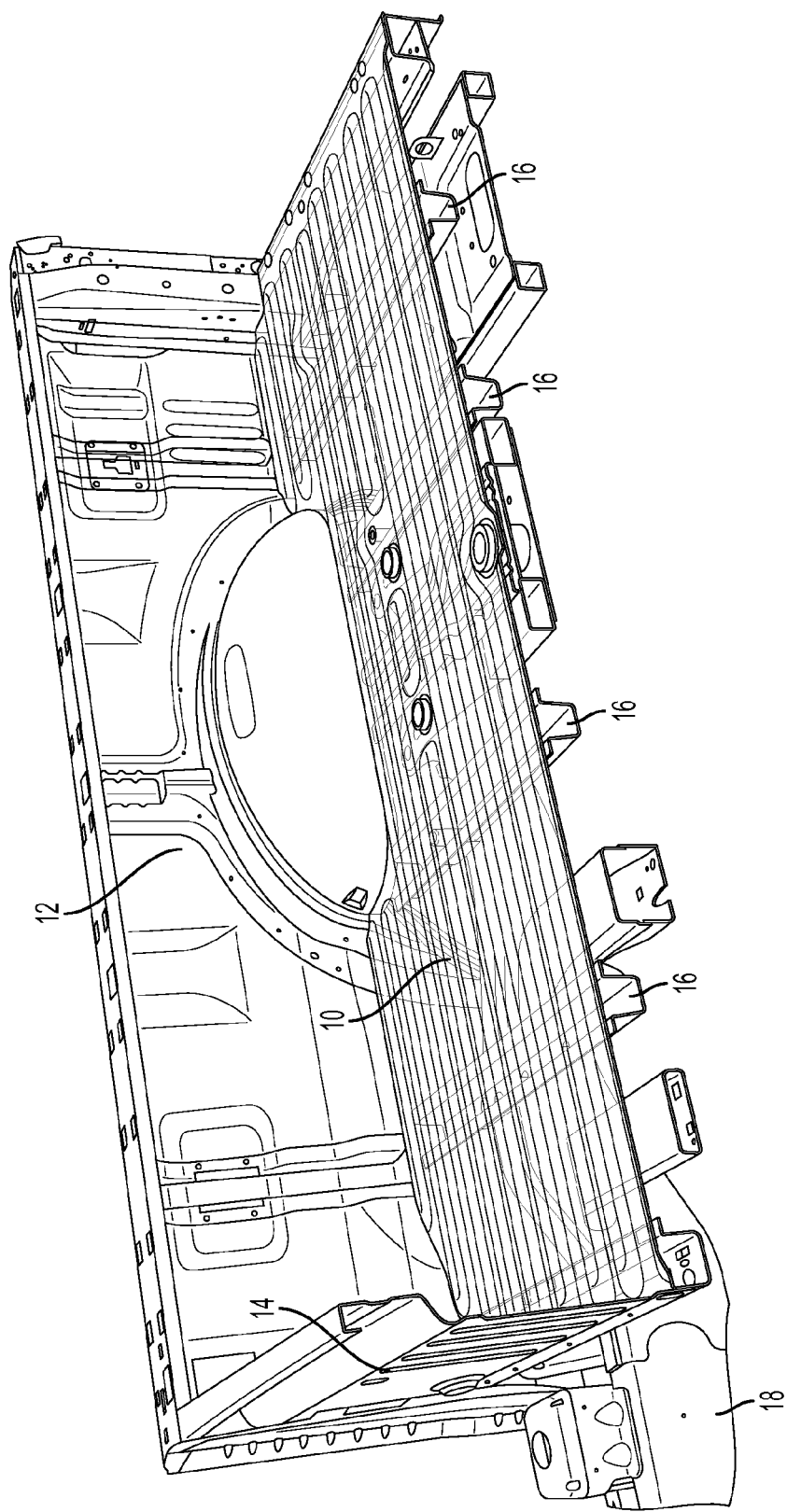
FIG. 1 is a cut-away pictorial view of a pickup bed.

FIG. 1 shows a cut-away view of a pickup truck box and frame rail. The box structure includes a floorpan 10, left and right sidewalls 12, and a headboard 14. The floorpan, sidewalls, and headboard may be formed from sheet metal by a stamping process. A number of cross members 16 are welded to the floorpan 10. The cross members may be formed from sheet metal using a roll forming process. Parts made from a roll forming process have a constant cross sectional shape. To vary the cross section of a roll formed part, a subsequent operation such as shear cutting must be performed. The floorpan, headboard, sidewalls, and cross members may be made of an aluminum alloy such as 6111. The box structure is bolted to frame rails 18.

Figure 2:
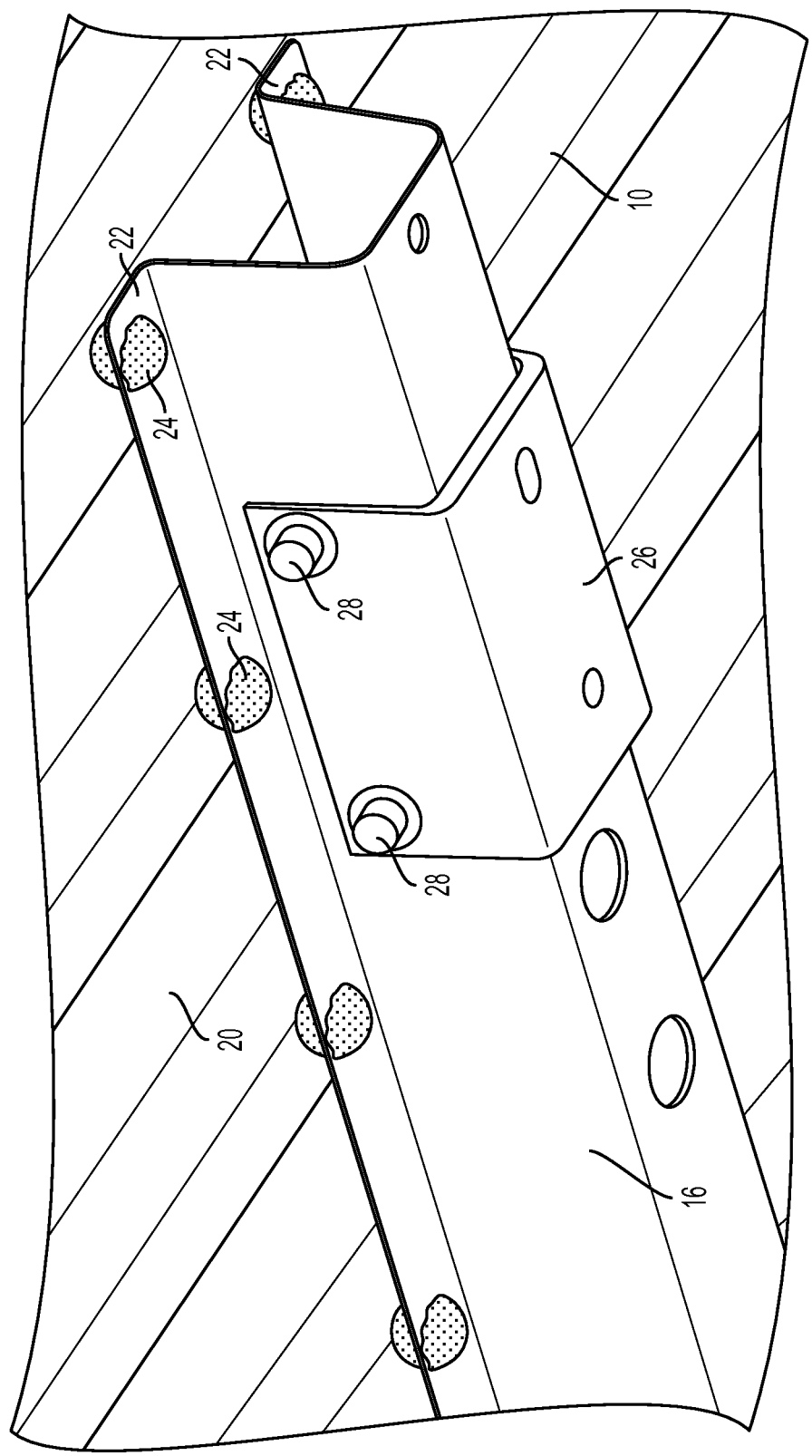
FIG. 2 is a bottom pictorial view of a portion of the pickup bed of FIG. 1.

FIG. 2 shows a bottom view of a portion of the pickup bed near the location at which the floorpan 10 is attached to one of the cross members 16. Note that a number of longitudinal beads 20 are stamped into the floorpan making some regions higher than other regions. Each cross member 16 has front and rear flanges 22. These flanges are welded to the flat regions of floorpan 10 at various weld locations 24 between the beads 20. A stiffener 26 is riveted to the cross member 16 at 28 to add rigidity where cross member 16 is bolted to the frame rails 18.

Figure 3:
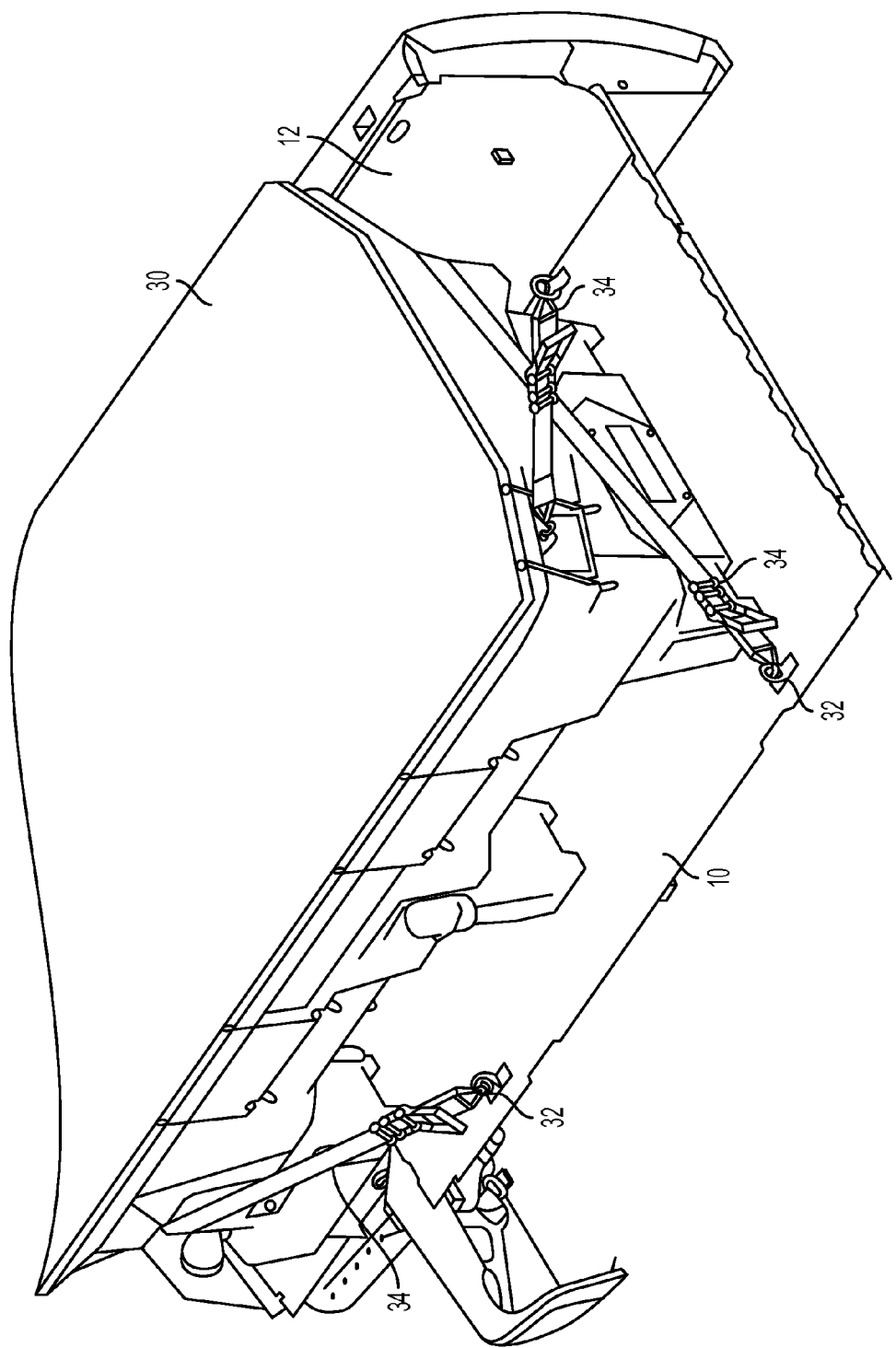
FIG. 3 is a cut-away pictorial view of a pickup bed after installation of an aftermarket accessory.

In use, a wide variety of loads may be exerted at various points in the box and in various directions. The box structure is designed to transmit these loads to the frame rails with acceptable levels of deflection and without weakening or loosening any joints or sustaining any permanent deformation. Some aftermarket accessories may be attached to the floorpan 10. These accessories may exert large concentrated loading at the attachment point. FIG. 3 shows a salt spreader 30 installed in the bed of a pickup truck. The instructions for installation of this salt spreader, like many other aftermarket accessories, calls for drilling holes in the floorpan and installing fasteners 32 into the holes. Then, straps 34 are tightened around the salt spreader to hold the spreader firmly in place.

When a vertical force is exerted on floorpan 10 at a location between cross members or aft of the rear cross member, floorpan 10 is loaded in bending. For example, an upward force exerted behind the rear cross member loads the raised portions formed by beads 20 in compression and the non-raised portions in tension. An upward force exerted between cross members loads the raised portions in tension and the non-raised portions in compression. The magnitude of the tension and compression stresses and the deflections increases as the distance between the force and the cross member increases. These loads are conveyed from the floorpan 10 to the frame rails 18 by cross members 16. The magnitude of the stresses in the cross member and the defections increase as the distance between the load and the frame rail increases.

Figure 4:
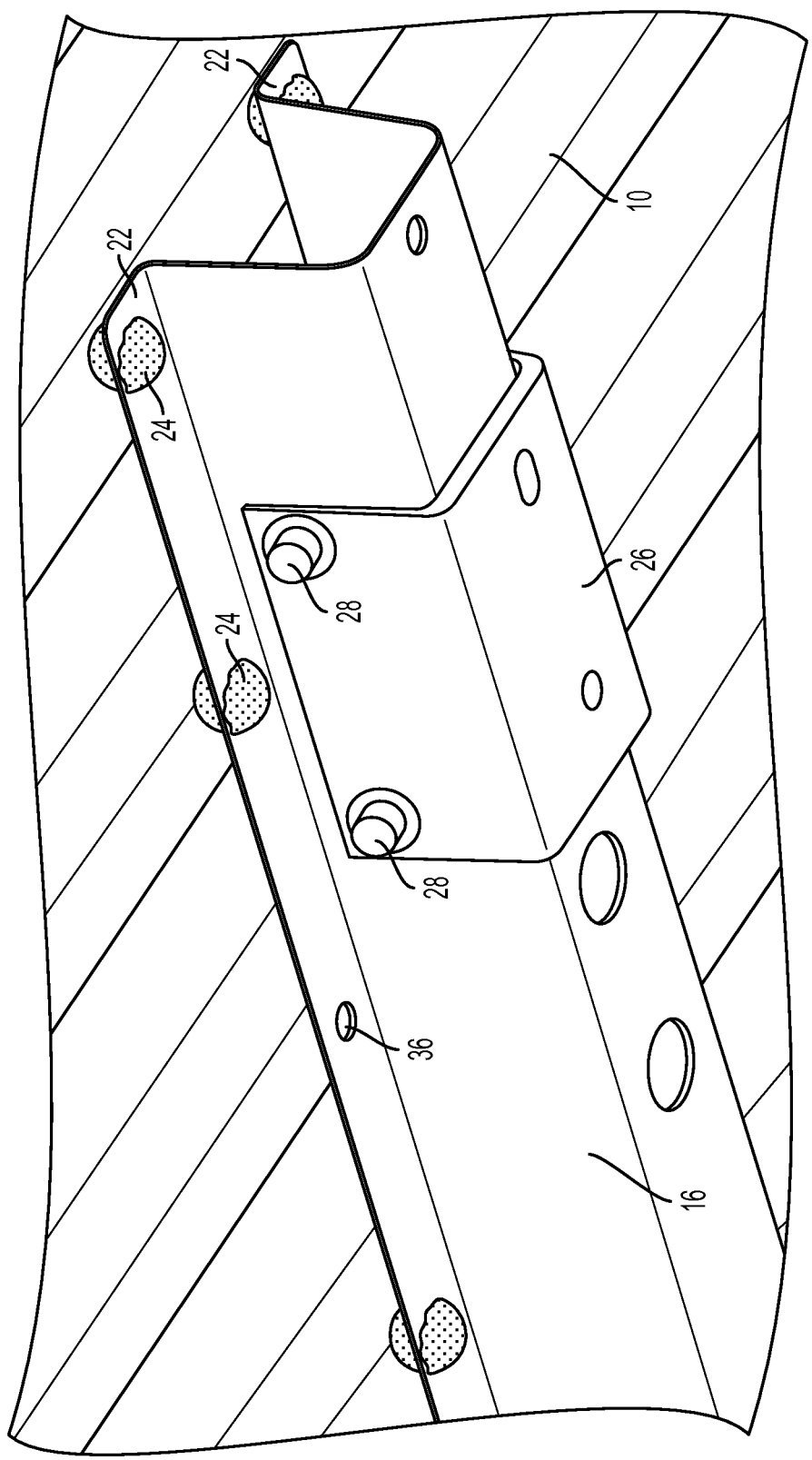
FIG. 4 is a bottom pictorial view of the pickup bed of FIG. 1 adapted to provide a suitable location for installation of aftermarket bed-mounted accessories.

Although the truck manufacturer cannot control where end users will elect to attach accessories, users can be encouraged to attach accessories in preferred locations. As shown in FIG. 4, a hole 36 is drilled in a flange of cross member 16 near the stiffener 26. This hole may be formed in the stock from which the cross member is formed. Alternatively, it may be drilled or stamped after the cross member is formed. When the vehicle is produced, the sheet metal floorpan 10 above hole 36 is imperforate. In other words, the floorpan does not have a hole aligned with hole 36, although the location may be marked on the top surface by a small indentation, for example. A customer installing an accessory that requires a hole is encouraged to drill the hole in this location. For example, text may be placed in the owner's manual, on an adhesive sticker near the hole, or stamped into the bottom surface of the floorpan 10 indicating that this location is preferred. A load applied through a fastener that extends through this hole will be applied directly to the flange and will not cause stress on the floorpan 10. Since the load is close to the location at which the cross member 16 bolts to the frame rail 18, the load is carried efficiently to the frame rail with minimal deflection. Cross member 16 may be reinforced in the vicinity of hole 36 to reduce local stresses and to absorb any crush forces exerted by installation of a fastener 32. For example, the material may be thicker in that region or an additional stiffener may be adhered to the flange in the vicinity of the hole. The stiffener may extend outwardly from the cross member 16 to provide a larger area for installation of the fastener.

Figure 5:
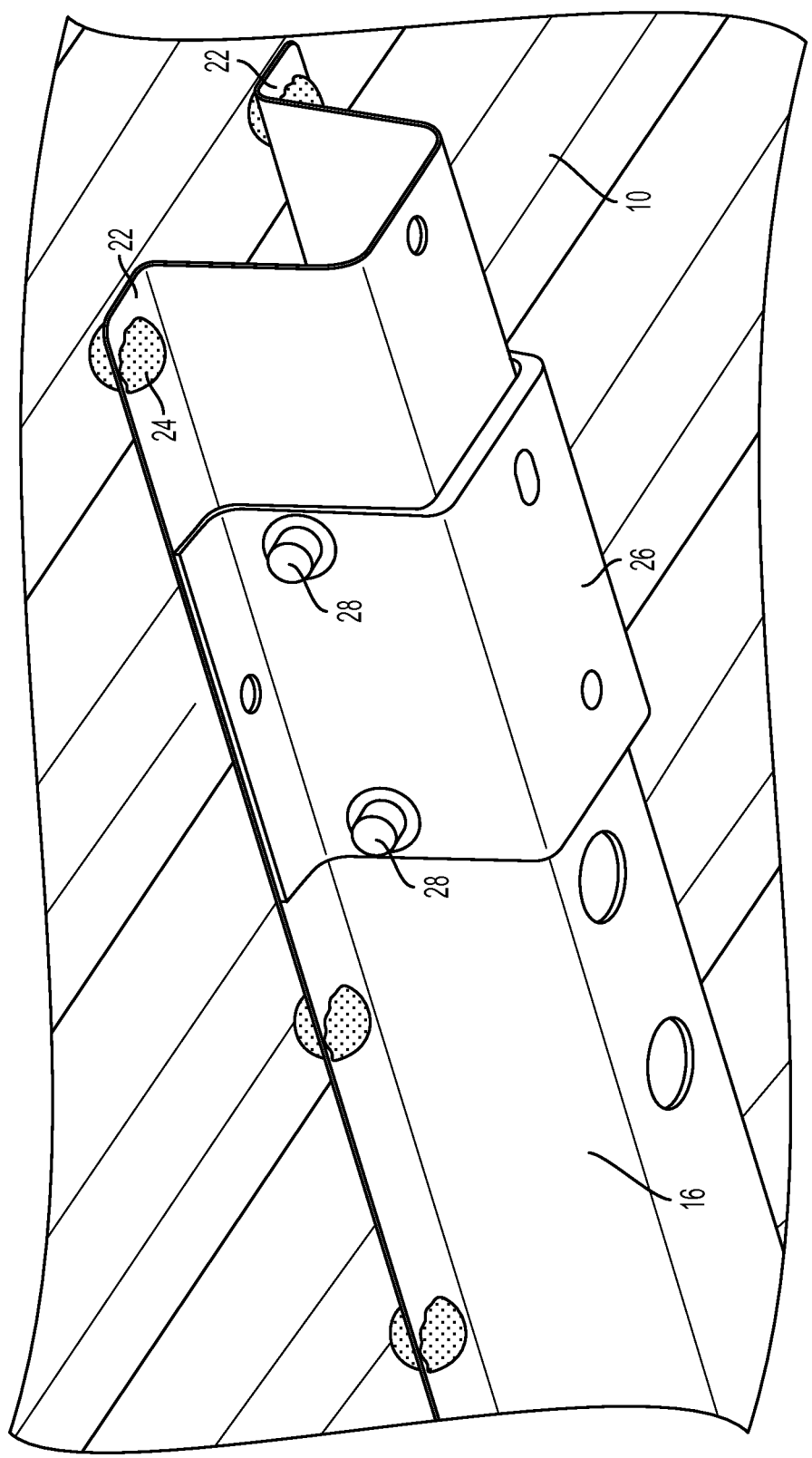
FIG. 5 is a bottom pictorial view of the pickup bed of FIG. 1 with an alternative adaptation to provide a suitable location for installation of aftermarket bed-mounted accessories.

FIG. 5 illustrates another embodiment. In this embodiment, the stiffener 26 is extended beyond the weld locations 24 and shaped to provide a suitable fastening location. In some embodiments, the stiffener may extend to the raised portion of one or more beads 20. A hole is drilled through the stiffener to mark the preferred fastener location but the hole does not extend through the floorpan 10. The end user completes the hole as part of installing an aftermarket accessory.

While exemplary embodiments are described above, it is not intended that these embodiments describe all possible forms encompassed by the claims. The words used in the specification are words of description rather than limitation. It is understood that various changes can be made and the features of various embodiments can be combined to form further embodiments of the invention that may not be explicitly described or illustrated. While various embodiments are described as providing advantages or being preferred over other embodiments or prior art implementations, those of ordinary skill in the art should recognize that one or more features or characteristics can be compromised to achieve desired overall system attributes that depend on the specific application and implementation. Embodiments described as less desirable than other embodiments or prior art implementations with respect to one or more characteristics are not outside the scope of the disclosure and can be desirable for particular applications.

What is claimed is:

1. A truck bed comprising:
a beaded sheet metal floorpan having a generally flat imperforate region; and
a cross member having a front flange welded to the floorpan and a rear flange welded to the floorpan, one of the front flange and rear flange defining a first hole abutting the flat imperforate region of the floorpan.

2. The truck bed of claim 1 wherein the cross member has a constant cross section.

3. The truck bed of claim 1 further comprising a reinforcement fixed to the cross member and defining a second hole aligned with the first hole.

4. The truck bed of claim 1 further comprising a stiffener fixed to the cross member and adapted for fixation to a frame rail.

5. The truck bed of claim 4 wherein no more than one bead is formed in the floorpan between the first hole and the stiffener.

6. A pickup truck comprising:
left and right frame rails;
a cross member bolted to the left and right frame rails, the cross member having a flange defining a first hole; and
a beaded floorpan welded to the cross member flange, the floorpan having a generally flat imperforate region covering the first hole.

7. The pickup truck of claim 6 wherein the cross member comprises:
a roll formed channel; and
a stiffener riveted to the roll-formed channel.

8. The pickup of claim 7 wherein the first hole is in the roll-formed channel.

9. The pickup of claim 7 wherein the first hole is in the stiffener.

10. The pickup of claim 6 further wherein the floorpan includes indicia indicative of instructions encouraging customers to align a second hole with the first hole if installation of an accessory requires the second hole.

11. A method of constructing a truck bed comprising:
roll forming a cross member having front and rear flanges, one of the front flange and the rear flange defining a hole;
stamping a floorpan to form a plurality of raised beads and an imperforate region between the beads; and
welding the cross member to an underside of the floorpan such that the hole is aligned with the imperforate region.

12. The method of claim 11 wherein the cross member and the floorpan are formed from aluminum alloy sheet stock.

13. The method of claim 12 wherein the aluminum alloy is a 6xxx series alloy.

14. The method of claim 11 wherein the cross member is roll formed from stock that is pre-formed with the hole.

15. The method of claim 11 further comprising cutting the cross member, after the roll forming, such that the flange is wider in the vicinity of the hole.

16. The method of claim 11 further comprising riveting a stiffener to the cross member.

17. The method of claim 16 wherein the stiffener defines a hole and the stiffener is welded to the cross member in a position such that the hole in the stiffener is adjacent to the hole in the flange.

\* \* \* \* \*